US010271011B2

(12) United States Patent
Ryu et al.

(10) Patent No.: US 10,271,011 B2
(45) Date of Patent: Apr. 23, 2019

(54) METHOD AND APPARATUS FOR COMMUNICATING MEDIA INFORMATION IN MULTIMEDIA COMMUNICATION SYSTEM

(71) Applicants: Samsung Electronics Co., Ltd., Suwon-si, Gyeonggi-do (KR); University-Industry Cooperation Group of Kyung Hee University, Yongin-si, Gyeonggi-do (KR)

(72) Inventors: Young-Sun Ryu, Seongnam-si (KR); Kyuheon Kim, Seoul (KR); Minwoo Jo, Seoul (KR); Jae-Yeon Song, Seoul (KR); Sung-Ryeul Rhyu, Yongin-si (KR); Gwang-Hoon Park, Seongnam-si (KR); Doug-Young Suh, Seongnam-si (KR)

(73) Assignees: Samsung Electronics Co., Ltd., Suwon-si (KR); University-Industry Cooperation Group of Kyung Hee University, Yongin-si (KR)

(*) Notice: Subject to any disclaimer, the term of this patent is extended or adjusted under 35 U.S.C. 154(b) by 0 days.

(21) Appl. No.: 14/944,595

(22) Filed: Nov. 18, 2015

(65) Prior Publication Data
US 2016/0073053 A1 Mar. 10, 2016

Related U.S. Application Data
(62) Division of application No. 14/054,293, filed on Oct. 15, 2013, now abandoned.

(30) Foreign Application Priority Data
Oct. 12, 2012 (KR) .................. 10-2012-0113841

(51) Int. Cl.
H04N 7/14 (2006.01)
H04N 21/41 (2011.01)
(Continued)

(52) U.S. Cl.
CPC ....... *H04N 7/147* (2013.01); *H04N 21/23412* (2013.01); *H04N 21/4126* (2013.01);
(Continued)

(58) Field of Classification Search
CPC ..................................... H04N 7/147
(Continued)

(56) References Cited
U.S. PATENT DOCUMENTS
5,706,290 A 1/1998 Shaw et al.
2004/0017513 A1 1/2004 Takahashi
(Continued)

FOREIGN PATENT DOCUMENTS
CN 1578392 A 2/2005
CN 101960445 A 1/2011
(Continued)

OTHER PUBLICATIONS

Jo et al., Proposal for Multi-Device Presentation Support in MMT-CI, International Organisation for Standardisation, ISO/IEC JTC1/SC29/WG11, Coding of Moving Pictures and Audio, Shanghai, China, Oct. 2012, MPEG2012/ M27156.
(Continued)

*Primary Examiner* — Maria El-Zoobi
(74) *Attorney, Agent, or Firm* — Jefferson IP Law, LLP

(57) ABSTRACT

A method for sending media information by a first terminal in a multimedia communication system is provided. The method includes generating scene configuration information that includes information regarding at least one medium of multiple media, and sending the scene configuration information to a second terminal, wherein the information
(Continued)

regarding the at least one medium includes at least one of information indicating whether to allow reproduction of the at least one medium in the second terminal, resource information used to reproduce the at least one medium, position information used to reproduce the at least one medium on a screen, and reproduction time information for the at least one medium.

5 Claims, 16 Drawing Sheets

(51) Int. Cl.
  *H04N 21/436*    (2011.01)
  *H04N 21/234*    (2011.01)
  *H04N 21/43*     (2011.01)
  *H04N 21/431*    (2011.01)
  *H04N 21/8355*   (2011.01)
  *H04N 21/8543*   (2011.01)

(52) U.S. Cl.
  CPC ....... *H04N 21/436* (2013.01); *H04N 21/4307* (2013.01); *H04N 21/4316* (2013.01); *H04N 21/4318* (2013.01); *H04N 21/83555* (2013.01); *H04N 21/8543* (2013.01)

(58) Field of Classification Search
  USPC ...................................................... 348/14.01
  See application file for complete search history.

(56) References Cited

U.S. PATENT DOCUMENTS

| | | |
|---|---|---|
| 2005/0017890 A1 | 1/2005 | Nam et al. |
| 2005/0169604 A1 | 8/2005 | Kim et al. |
| 2006/0136828 A1* | 6/2006 | Asano ................... G06F 3/1454 715/733 |
| 2006/0282874 A1 | 12/2006 | Ito et al. |
| 2007/0011702 A1 | 1/2007 | Vaysman |
| 2007/0208992 A1 | 9/2007 | Koren |
| 2008/0010664 A1* | 1/2008 | Pelizza ............... H04N 5/44508 725/134 |
| 2008/0066103 A1 | 3/2008 | Ellis et al. |
| 2008/0072139 A1* | 3/2008 | Salinas ............... G06F 16/9577 715/238 |
| 2008/0085682 A1 | 4/2008 | Rao |
| 2008/0092157 A1 | 4/2008 | Walter et al. |
| 2008/0094415 A1 | 4/2008 | Lee et al. |
| 2008/0155614 A1 | 6/2008 | Cooper et al. |
| 2009/0216745 A1 | 8/2009 | Allard |
| 2009/0265603 A1* | 10/2009 | Hwang .................... H04N 7/24 715/201 |
| 2010/0111491 A1 | 5/2010 | Kamoto |
| 2011/0009166 A1 | 1/2011 | Noh et al. |
| 2011/0030000 A1* | 2/2011 | Tojima ................... G08C 17/00 725/28 |
| 2011/0032420 A1 | 2/2011 | Baek et al. |
| 2011/0156879 A1 | 6/2011 | Matsushita et al. |
| 2011/0222676 A1* | 9/2011 | Okada .................... H04N 7/147 379/93.21 |
| 2011/0299832 A1 | 12/2011 | Butcher |
| 2011/0304686 A1 | 12/2011 | Qiu et al. |
| 2012/0011226 A1 | 1/2012 | Katz et al. |
| 2012/0011544 A1* | 1/2012 | Vaysman ........... H04N 5/44543 725/38 |
| 2012/0042351 A1 | 2/2012 | Wang et al. |
| 2012/0146900 A1 | 6/2012 | Ishimoto et al. |
| 2012/0200776 A1 | 8/2012 | Tanaka et al. |
| 2013/0050059 A1* | 2/2013 | Shigeta ............. H04N 21/4122 345/1.1 |
| 2014/0064697 A1 | 3/2014 | Kaneko et al. |
| 2014/0089821 A1* | 3/2014 | Rios, III ................... G06F 3/14 715/761 |
| 2014/0237536 A1 | 8/2014 | Jang et al. |
| 2014/0298157 A1* | 10/2014 | Lim .................... G06F 17/2247 715/234 |
| 2015/0020139 A1* | 1/2015 | Rhyu ............... H04N 21/23412 725/116 |

FOREIGN PATENT DOCUMENTS

| | | |
|---|---|---|
| JP | 2005-045605 A | 2/2005 |
| JP | 2009-123178 A | 6/2009 |
| JP | 2009-253782 A | 10/2009 |
| JP | 2012-128579 A | 7/2012 |
| KR | 10-2008-0081182 A | 9/2008 |
| RU | 2 315 370 C2 | 7/2006 |
| TW | 200704183 A | 1/2007 |
| WO | 2010-150505 A1 | 12/2010 |
| WO | 2011-040152 A1 | 4/2011 |

OTHER PUBLICATIONS

Kim et al., Proposal for CI Architecture in MMT, International Organisation for Standardisation, ISO/IEC JTC1/SC29/ WG11, Coding of Moving Pictures and Audio, San Jose, 2012, MPEG2012/ M23881.

Chiariglione; Report of 99th Meeting Status; International Organisation for Standardisation; Organisation Iternationalel de Normalisation; ISO/IEC JTC 1/SC 29/WG11; Coding of Moving Pictures and Audio; ISO/IEC JTC 1/ SC 29/WG11; N12454; XP030018928; Feb. 2012; San Jose, CA.

Japanese Office Action dated Nov. 28, 2017, issued in the Japanese Patent Application No. 2015-536719.

Korean Decision of Grant Action dated Dec. 26, 2018, issued in Korean Application No. 10-2012-0113841.

\* cited by examiner

METHOD AND APPARATUS FOR COMMUNICATING MEDIA INFORMATION IN MULTIMEDIA COMMUNICATION SYSTEM

CROSS-REFERENCE TO RELATED APPLICATION(S)

This application is a divisional application of prior application Ser. No. 14/054,293, filed on Oct. 15, 2013, which claimed the benefit under 35 U.S.C. § 119(a) of a Korean patent application filed on Oct. 12, 2012, in the Korean Intellectual Property Office and assigned Serial number 10-2012-0113841, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) UNIVERSITY-INDUSTRY COOPERATION GROUP OF KYUNG HEE UNIVERSITY

TECHNICAL FIELD

The present disclosure relates to a multimedia communication system. More particularly, the present disclosure relates to a method and apparatus for communicating media information in a multimedia communication system.

BACKGROUND

With the adoption in the marketplace of smartphones, tablet Personal Computers (PCs), and smart TeleVisions (TVs), a smart media environment exists. Development of smart devices led by the smartphone fulfills a cross media environment while promoting the use of multi-screens for smart TVs, tablet PCs, and cloud computing, while replacing three related-art screens for the PC, the TV and the mobile devices. With the growth of smart media and cloud computing, and a change in a communication environment, full-scale multi-screen services are expected to emerge.

The multi-screen service refers to a next generation computing/network service for exchanging one or more media in various terminals, such as smartphones, PCs, smart TVs, tablet PCs, etc. The multi-screen service enables users to use media in any place as well as to use a variety of media simultaneously with many terminals.

The multi-screen service has some similar aspects to scene configuration information in that a large number of media may be used by a large number of terminals at the same time and that arrangement of shared media on the screen may be required. Accordingly, a need exists for a method for exchanging media between terminals for a multi-screen service with scene configuration information.

Providing the scene configuration information and multi-screen information means that two services are provided through different applications, which may cause two problems. First, providing different services at the same time may burden the terminals. Second, if a user sees two running applications displayed on a single screen, the media mismatch may cause degraded quality of service and user experience.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for communicating media information in a multimedia communication system.

The present disclosure also provides a method and apparatus for communicating media between terminals using scene configuration information.

The present disclosure also provides a method and apparatus that enables multiple terminals to configure a screen efficiently based on media communication.

In accordance with an aspect of the present disclosure, a method for sending media information by a first terminal in a multimedia communication system is provided. The method includes generating scene configuration information that includes information regarding at least one medium of multiple media, and sending the scene configuration information to a second terminal, wherein the information regarding the at least one medium includes at least one of information indicating whether to allow reproduction of the at least one medium in the second terminal, resource information used to reproduce the at least one medium, position information used to reproduce the at least one medium on a screen, and reproduction time information for the at least one medium.

In accordance with another aspect of the present disclosure, a method for receiving media information by a second terminal in a multimedia communication system is provided. The method includes receiving from a first terminal scene configuration information that includes information regarding at least one medium of multiple media, and reproducing the at least one medium based on the scene configuration information, wherein the information regarding the at least one medium includes at least one of information indicating whether to allow reproduction of the at least one medium in the second terminal, resource information used to reproduce the at least one medium, position information used to reproduce the at least one medium on a screen, and reproduction time information for the at least one medium.

In accordance with another aspect of the present disclosure, a first terminal of a multimedia communication system is provided. The first terminal includes a controller for generating scene configuration information that includes information regarding at least one medium of multiple media, and a transmitter for sending the scene configuration information to a second terminal, wherein the information regarding the at least one medium includes at least one of information indicating whether to allow reproduction of the at least one medium in the second terminal, resource information used to reproduce the at least one medium, position information used to reproduce the at least one medium on a screen, and reproduction time information for the at least one medium.

In accordance with another aspect of the present disclosure, a second terminal of a multimedia communication system is provided. The second terminal includes a receiver for receiving from a first terminal scene configuration information that includes information regarding at least one medium of multiple media, and a controller for reproducing the at least one medium based on the scene configuration information, wherein the information regarding the at least one medium includes at least one of information indicating whether to allow reproduction of the at least one medium in the second terminal, resource information used to reproduce the at least one medium, position information used to reproduce the at least one medium on a screen, and reproduction time information for the at least one medium.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
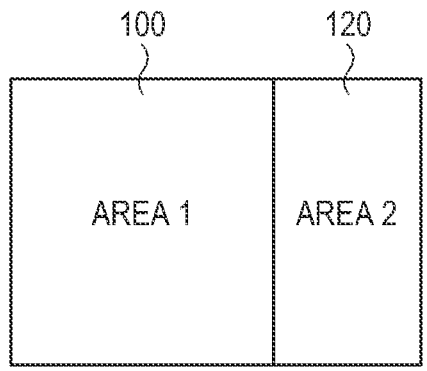
FIG. 1 illustrates arrangement of areas on a screen based on Composition Information (CI) according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural references unless the context clearly dictates otherwise. Thus, for example, reference to "a component surface" includes reference to one or more of such surfaces.

The terminology used herein is for the purpose of describing particular embodiments only and is not intended to be limiting to the disclosure.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure provides a method and apparatus for communicating media information in a multimedia communication system. Specifically, embodiments of the present disclosure provide a method for providing media communication related attributes by using scene configuration information in order for one or more media to be reproduced (or played) by another terminal, a method for defining events for providing times to obtain and return media, and a method for transferring media resource information and scene configuration information. Other various embodiments of the present disclosure may also provide apparatuses associated with the methods.

In various embodiments of the present disclosure, media services using scene configuration information (interchangeably called Composition Information (CI)) will be explained. However, embodiments of the present disclosure are not limited to the media services using the scene configuration information but may be applied to any other areas that offer services by configuring various multimedia in combination.

In various embodiments, the scene configuration information may include time and space information of various media and information for describing relationships between elements of the scene configuration information.

The scene configuration information may be created with eXtensible Markup Language (XML). The scene configuration information and associated information are defined as shown in Table 1.

TABLE 1

| Information | Definition |
| --- | --- |
| CI (Composition Information) | scene configuration information |
| Asset | single medium (represented in XML as video, audio, image, etc. depending on the media type) |
| LoA (List of Asset) | list of attributes of multiple assets |
| AI (Asset Information) | attribute information of asset |
| src | resource information of asset |
| view | scene |
| Area | a set of assets in which one or more assets are configured in an independent time and space, which is represented in XML as div |
| divLocation | part of the view for arranging one Area on a screen |
| head | a set of LoA, AI, view and divLocation related information |
| body | a set of Area related information |
| width, height, left (left space), top (top space), z-index (reproduction priority if spatial overlap exists) | spatial information for Asset, view, Area and divLocation |
| begin (time to start reproduction), end (time to stop reproduction), dur (duration of reproduction) | time information for Asset, view, Area and divLocation |

Various embodiments of the present disclosure will now be described in detail with reference to the attached drawings.

In a case where there are multiple terminals in a multimedia communication system, media communication between the terminals may be performed. That is, a terminal may provide media to another terminal, which may in turn reproduce (or play) the media.

As used herein, a terminal that provides media to another terminal is referred to as a primary device, and the other terminal that receives the media from the primary device is referred to as a secondary device.

The primary device or the secondary device may each configure a screen by using CI as represented in Table 2. Table 2 represents an example of the CI.

TABLE 2

```
<CI>
<head>
    <LoA>
        <AI id="Asset1" src="mmt://package1/asset1"
        mediatype="video"/>
        <AI id="Asset2" src="mmt://package1/asset2"
        mediatype="video"/>
        <AI id="Asset3" src="mmt://package1/asset3"
        mediatype="video"/>
    </LoA>
    <view id="View1" width="1920px" height="1080px">
        <divLocation id="divL1" width="70%" height="100%"
left="0%" top="0%" refDiv="Area1"/>
        <divLocation id="divL2" width="30%" height="100%"
left="70%" top="0%" refDiv="Area2"/>
    </view>
</head>
<body>
    <div id="Area1" width="1000px" height="1000px">
        <video id="video1" refAsset="Asset1" width="100%"
height="100%" left="0px" top="0px"/>
    </div>
    <div id="Area2" width="600px" height="1000px">
        <video id="video2" refAsset="Asset2" width="100%"
height="100%" left="0px" top="0px"/>
    </div>
    <div id="Area3" width="1024px" height="768px">
        <video id="video3" refAsset="Asset3" width="100%"
```

TABLE 2-continued

```
height="100%" left="0px" top="0px"/>
    </div>
</body>
</CI>
```

Referring to <body> part in Table 2, there are three video assets, "video1", "video2", and "video3", which may be arranged respectively in "Area1", "Area2", and "Area3", each of which has different spatial information. The three video assets may be represented in the form of resource information and media types as shown in <LoA> part under <head>, and "video1" and "video2" among the three video assets may be arranged in a view based on two divLocations of <div>. A screen based on the CI of Table 2 may be configured as shown in FIG. 1.

FIG. 1 illustrates arrangement of areas on a screen based on CI according to an embodiment of the present disclosure.

Referring to FIG. 1, based on the CI of Table 2, Area1 100 and Area2 120 that includes "video1" and "video2", respectively, among the three video assets, are arranged in corresponding positions.

If there are multiple terminals, e.g., the primary device and the secondary device, the primary and secondary devices each reproduce (or play) the medium by configuring a screen in various forms depending on the CI. The CI may be provided by e.g., a media server to each of the primary and secondary devices, or may be provided by the primary device to the secondary device as will be described below.

In various embodiments, methods for enabling the primary and secondary devices to reproduce media with various forms of screen configuration are provided. Specifically, the embodiments include (1) a method for restricting media reproduction at the secondary device, (2) a method for enabling the secondary device to reproduce particular media, (3) a method for reproducing the same media in the primary and secondary devices, (4) a method for transferring media to the secondary device for reproduction, and (5) a method for reconfiguring a screen in response to media communication.

Each of the methods will be described in detail below.
(1) A Method for Restricting Media Reproduction at the Secondary Device In order to restrict media reproduction in the secondary device, CI as shown in Table 3 may be used.

TABLE 3

```
<CI>
<head>
    <LoA>
        <AI id="Asset1" src="mmt://package1/asset1"
        mediatype="video"/>
        <AI id="Asset2" src="mmt://package1/asset2"
        mediatype="video"/>
        <AI id="Asset3" src="mmt://package1/asset3"
        mediatype="video"/>
    </LoA>
    <view id="View1" width="1920px" height="1080px">
        <divLocation id="divL1" width="70%" height="100%"
left="0%" top="0%" refDiv="Area1" plungeOut="disable" />
        <divLocation id="divL2" width="30%" height="100%"
left="70%" top="0%" refDiv="Area2"/>
    </view>
</head>
<body>
    <div id="Area1" width="1000px" height="1000px">
        <video id="video1" refAsset="Asset1" width="100%"
height="100%" left="0px" top="0px"/>
    </div>
    <div id="Area2" width="600px" height="1000px">
        <video id="video2" refAsset="Asset2" width="100%"
height="100%" left="0px" top="0px"/>
    </div>
    <div id="Area3" width="1024px" height="768px">
        <video id="video3" refAsset="Asset3" width="100%"
height="100%" left="0px" top="0px"/>
    </div>
</body>
</CI>
```

Table 3 represents CI that has additional information for restricting reproduction at the secondary device, in addition to the CI as shown in Table 2, and the additional information is referred to as reproduction restriction information (plungeOut="disable"). In the CI of Table 3, plungeOut="disable" represents that reproduction of "video1" included in Area 1 indicated by divLocation of "divL1" is restricted.

One or more assets may be enclosed in an Area, and thus the Area is conveniently used to transfer multiple assets to the secondary device. Thus, the Area may be used as a unit of transferring assets. DivLocation provides features for arranging the Area on a screen, so it may also provide information regarding media communication, i.e., the reproduction restriction information. According to the method, operations of the primary device and secondary device are illustrated in FIGS. 2 and 3, respectively.

Figure 2:
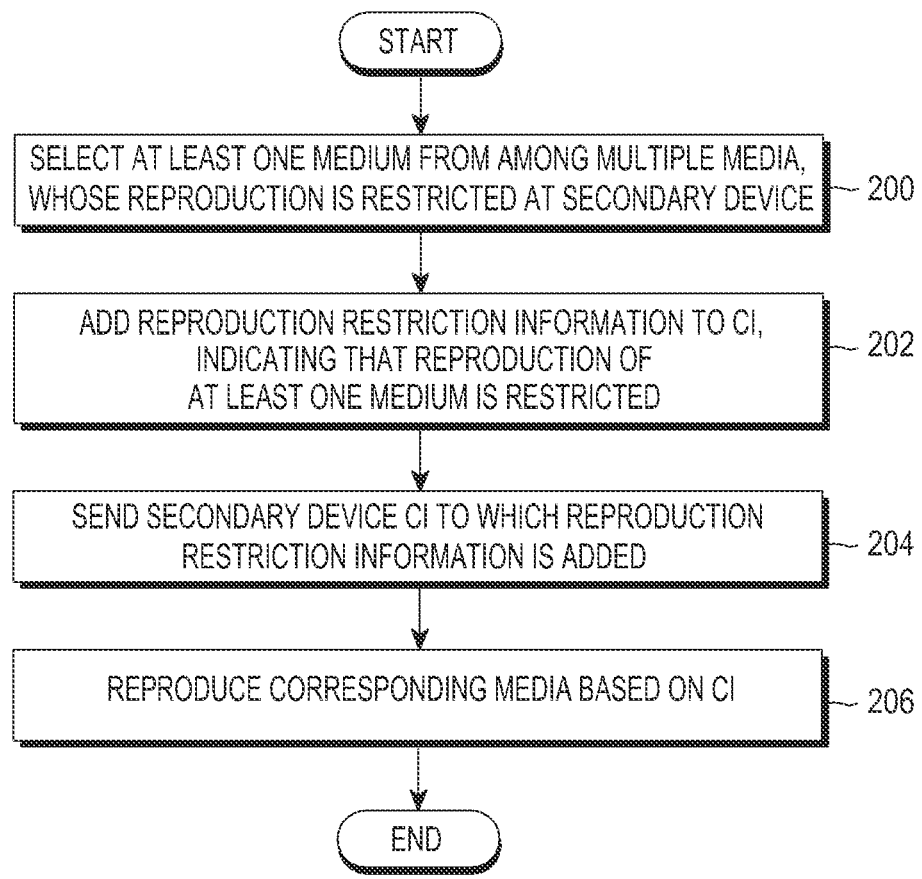
FIG. 2 is flowchart illustrating operations of a primary device for restricting particular media reproduction in a secondary device according to an embodiment of the present disclosure.
Figure 3:
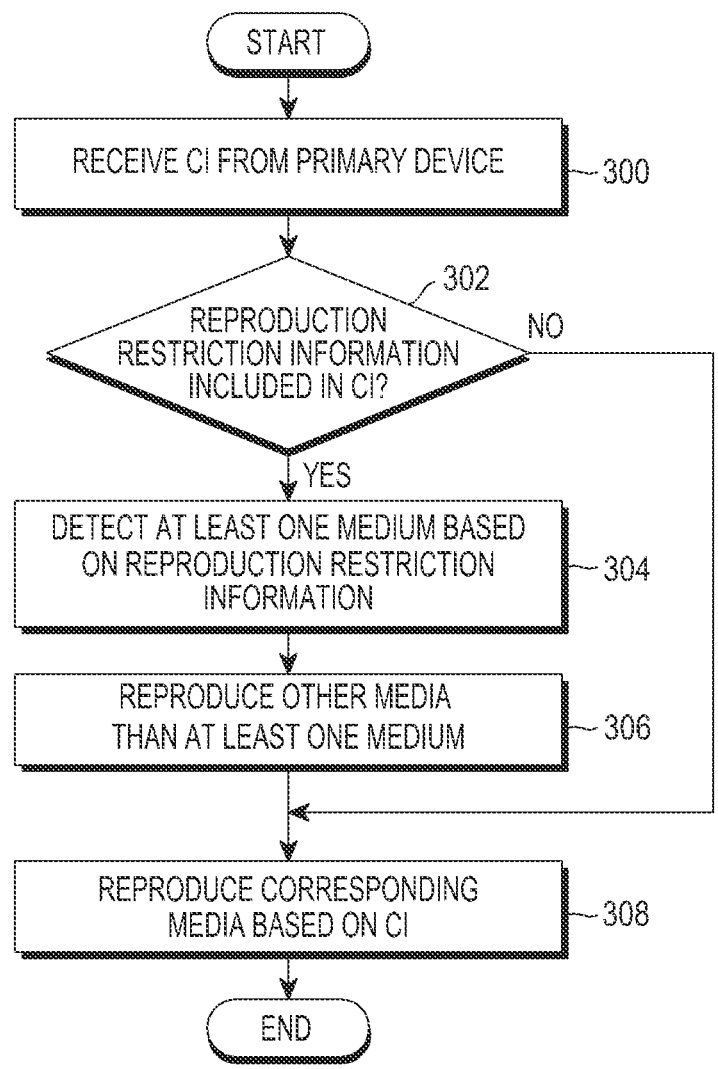
FIG. 3 is flowchart illustrating operations of a secondary device at which particular media reproduction is restricted according to an embodiment of the present disclosure.

FIG. 2 is flowchart illustrating operations of the primary device for restricting particular media play at the secondary device according to an embodiment of the present disclosure.

Referring to FIG. 2, in operation 200, the primary device selects at least one medium from among a large number of media, whose reproduction is to be restricted at the secondary device. Selecting the at least one medium may be performed in response to a user input or under a separate control.

In operation 202, the primary device adds the reproduction restriction information (plungeOut="disable") to CI, indicating that reproduction of the selected at least one medium is to be restricted. In operation 204, the primary device sends the CI that includes the reproduction restriction information to the secondary device.

In operation 206, the primary device reproduces media based on the CI. The primary device may reproduce the at least one medium whose reproduction is restricted at the secondary device.

FIG. 3 is flowchart illustrating operations of a secondary device at which particular media reproduction is restricted according to an embodiment of the present disclosure.

Referring to FIG. 3, in operation 300, the secondary device receives the CI from the primary device. In operation 302, the secondary device determines whether the CI contains the reproduction restriction information.

If the CI does not contain the reproduction restriction information, in operation 308, the secondary device reproduces the media based on the CI. If the CI contains the reproduction restriction information, in operation 304, the secondary device detects at least one medium based on the reproduction restriction information. In operation 306, the secondary device reproduces other media than the detected at least one medium.
(2) A Method for Reproducing Particular Media in the Secondary Device FIGS. 4A and 4B illustrate particular media being reproduced at the secondary device according to an embodiment of the present disclosure.

Figures 4A, 4B:
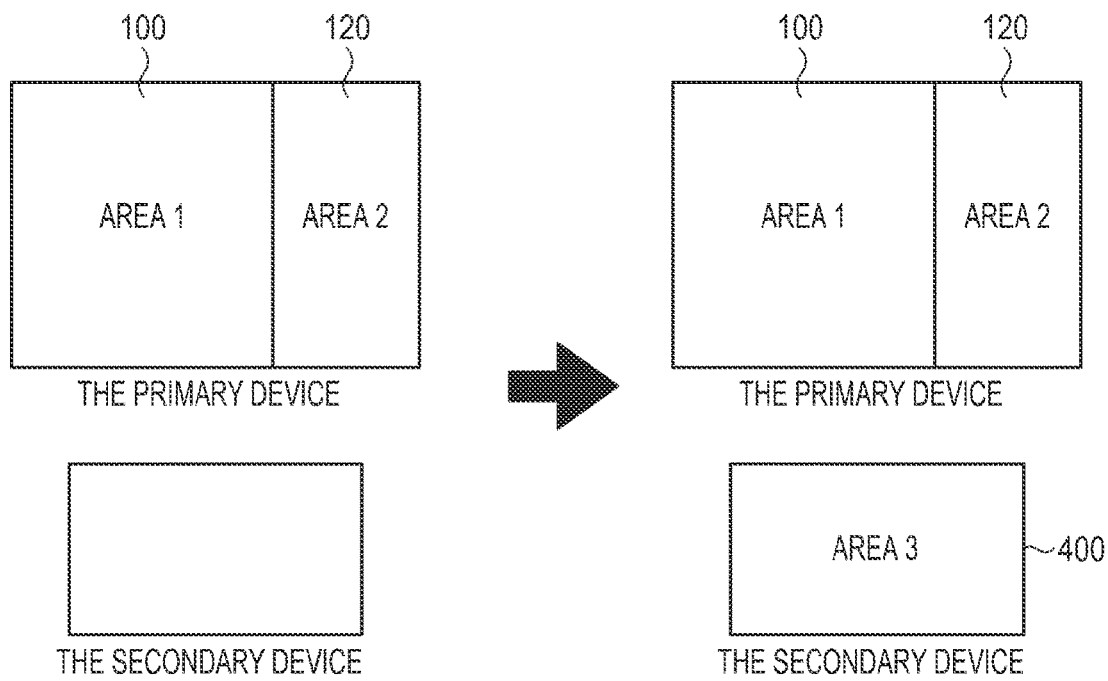
FIGS. 4A and 4B illustrate particular media being reproduced at a secondary device according to an embodiment of the present disclosure.

Referring to FIG. 4A, the primary device may reproduce and display "video1" of Area1 100 and "video2" of Area2 120 on the screen, as shown in FIG. 1. The primary device may use CI as represented in Table 4 to enable a medium not being reproduced in the primary device to be reproduced in the secondary device as shown in FIG. 4B.

TABLE 4

```
<CI>
<head>
    <LoA>
        <AI id="Asset1" src="mmt://package1/asset1"
        mediatype="video"/>
        <AI id="Asset2" src="mmt://package1/asset2"
        mediatype="video"/>
        <AI id="Asset3" src="mmt://package1/asset3"
        mediatype="video"/>
```

TABLE 4-continued

```
    </LoA>
      <view id="View1" width="1920px" height="1080px">
        <divLocation id="divL1" width="70%" height="100%"
left="0%" top="0%" refDiv="Area1"/>
          <divLocation id="divL2" width="30%" height="100%"
left="70%" top="0%" refDiv="Area2"/>
          <divLocation id="divL3" width="1024px" height="768px"
left="0px" top="0px" refDiv="Area3" plungeOut="complementary"/>
      </view>
  </head>
  <body>
      <div id="Area1" width="1000px" height="1000px">
        <video id="video1" refAsset="Asset1" width="100%"
height="100%" left="0px" top="0px"/>
      </div>
      <div id="Area2" width="600px" height="1000px">
        <video id="video2" refAsset="Asset2" width="100%"
height="100%" left="0px" top="0px"/>
      </div>
      <div id="Area3" width="1024px" height="768px">
        <video id="video3" refAsset="Asset3" width="100%"
height="100%" left="0px" top="0px"/>
      </div>
  </body>
</CI>
```

Table 4 represents the CI that has additional information for allowing for reproduction in the secondary device, in addition to the CI as shown in Table 2, and the information is referred to as reproduction allowance information (plungeOut="complementary"). In the CI of Table 4, plungeOut="complementary" is provided in divLocation as information regarding media communication, indicating that "video3" of Area3 400 which is present but not shown in the view based on divLocation is allowed to be reproduced in the secondary device while being restricted in the primary device.

Figure 5:
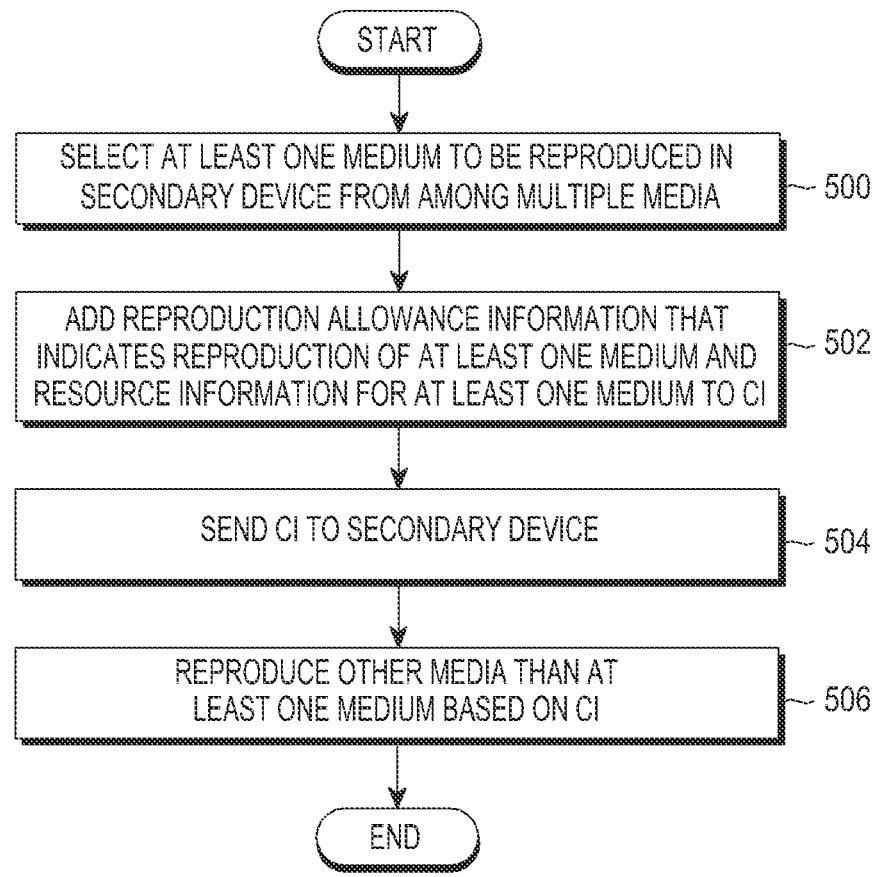
FIG. 5 is flowchart illustrating operations of a primary device for enabling a secondary device to reproduce particular media according to an embodiment of the present disclosure.
Figure 6:
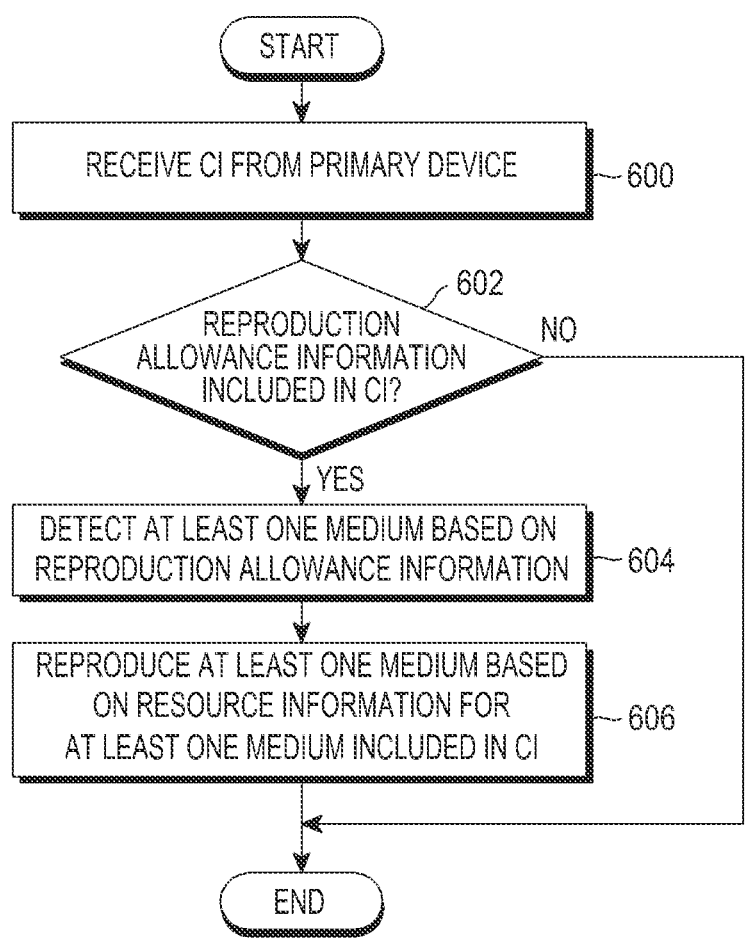
FIG. 6 is flowchart illustrating operations of a secondary device that reproduces particular media according to an embodiment of the present disclosure.

According to this method, operations of the primary device and secondary device are illustrated in FIGS. 5 and 6, respectively.

FIG. 5 is flowchart illustrating operations of the primary device for enabling the secondary device to reproduce particular media according to an embodiment of the present disclosure.

Referring to FIG. 5, in operation 500, the primary device selects at least one medium from among multiple media, which is to be reproduced in the secondary device. Selecting the at least one medium may be performed in response to a user input or under a separate control.

In operation 502, the primary device adds the reproduction allowance information (plungeOt="complementary") that indicates to reproduce the selected at least one medium, to the CI together with resource information of the selected at least one medium.

In operation 504, the primary device sends the resultant CI to the secondary device, and in operation 506, the primary device reproduces corresponding media based on the CI. The primary device may reproduce other media than the at least one medium allowed to be reproduced in the secondary device.

FIG. 6 is flowchart illustrating operations of the secondary device that reproduces particular media according to an embodiment of the present disclosure.

Referring to FIG. 6, in operation 600, the secondary device receives the CI from the primary device. In operation 602, the secondary device determines whether the CI contains the reproduction allowance information.

If the CI contains the reproduction allowance information, in operation 604, the secondary device detects from the CI at least one medium based on the reproduction restriction information. In operation 606 the secondary device reproduces the at least one medium based on the resource information of the at least one medium contained in the CI.

If the CI does not contain the reproduction allowance information, the secondary device ends the procedure.

(3) A Method for Reproducing the Same Media in Primary and Secondary Devices

Figures 7A, 7B:
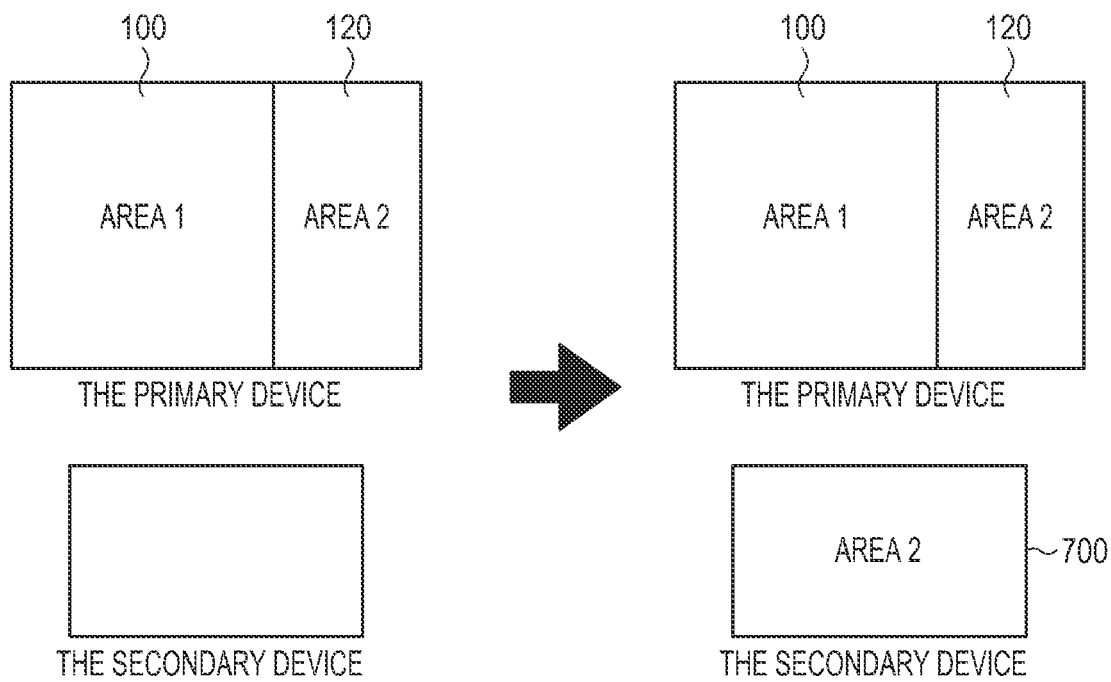
FIGS. 7A and 7B illustrate a primary device and a secondary device both reproducing the same media according to an embodiment of the present disclosure.

FIGS. 7A and 7B illustrate the primary and secondary devices reproducing the same media according to an embodiment of the present disclosure.

Referring to FIG. 7A, the primary device may reproduce and display "video1" of Area1 100 and "video2" of Area2 120 on the screen, as shown in FIG. 1. A medium being reproduced by the primary device may be reproduced by the secondary device as well, as shown in FIG. 7B. Referring to FIG. 7B, "video2" is reproduced in both Area2 120 of the primary device and Area2 700 of the secondary device.

Such simultaneous media reproduction may make use of CI as represented in Table 5.

TABLE 5

```
<CI>
<head>
    <LoA>
      <AI id="Asset1" src="mmt://package1/asset1"
        mediatype="video"/>
        <AI id="Asset2" src="mmt://package1/asset2"
        mediatype="video"/>
        <AI id="Asset3" src="mmt://package1/asset3"
        mediatype="video"/>
    </LoA>
      <view id="View1" width="1920px" height="1080px">
        <divLocation id="divL1" width="70%" height="100%"
left="0%" top="0%" refDiv="Area1"/>
          <divLocation id="divL2" width="30%" height="100%"
left="70%" top="0%" refDiv="Area2" plungeOut="sharable"/>
      </view>
</head>
<body>
      <div id="Area1" width="1000px" height="1000px">
        <video id="video1" refAsset="Asset1" width="100%"
height="100%" left="0px" top="0px"/>
      </div>
      <div id="Area2" width="600px" height="1000px">
        <video id="video2" refAsset="Asset2" width="100%"
height="100%" left="0px" top="0px"/>
      </div>
      <div id="Area3" width="1024px" height="768px">
        <video id="video3" refAsset="Asset3" width="100%"
height="100%" left="0px" top="0px"/>
      </div>
</body>
</CI>
```

Table 5 represents the CI that has additional information for allowing for simultaneous reproduction in the primary and secondary devices, in addition to the CI as shown in Table 2, and the information is referred to as simultaneous reproduction allowance information (plungeOut="sharable"). In the CI of Table 5, plungeOut="sharable" is provided in divLocation as information regarding media communication, indicating that "video2" is allowed to be reproduced in the primary device at Area2 120 and the secondary device at Area2 700, simultaneously.

Figure 8:
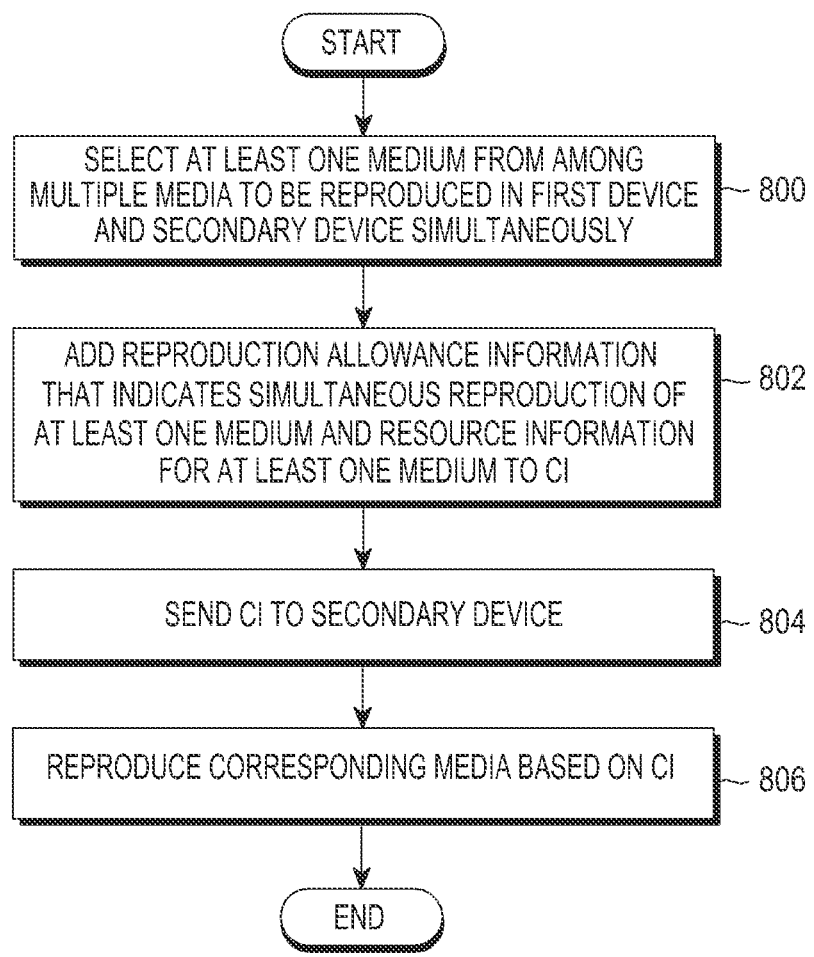
FIG. 8 is flowchart illustrating operations of a primary device that reproduces the same media as that of a secondary device according to an embodiment of the present disclosure.
Figure 9:
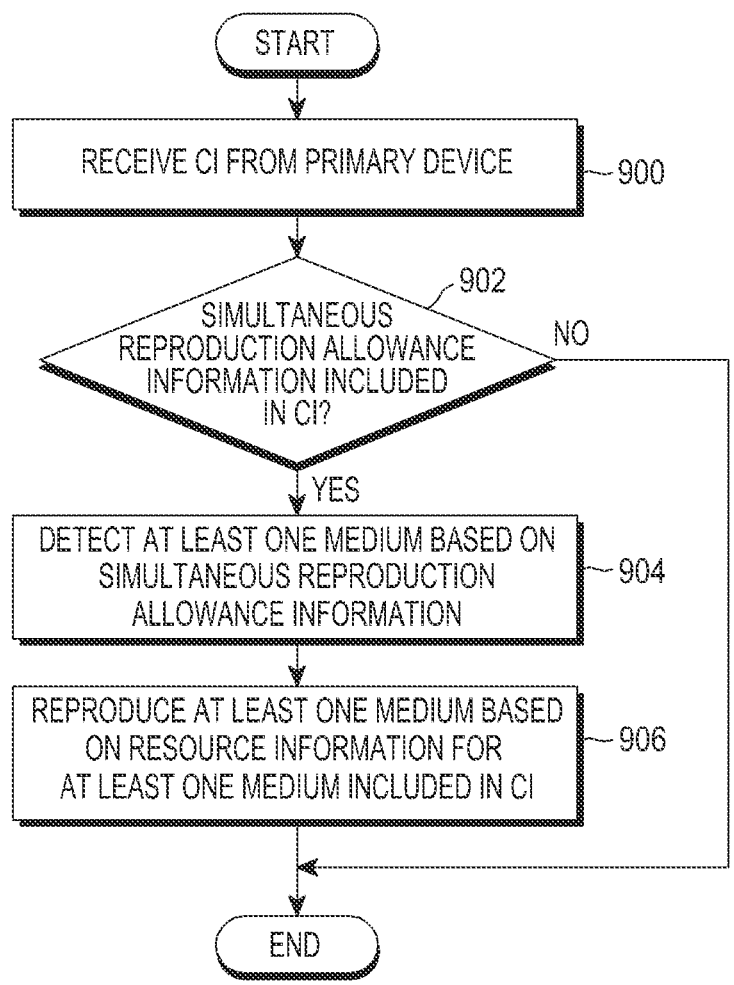
FIG. 9 is flowchart illustrating operations of a secondary device that reproduces the same media as that of a primary device according to an embodiment of the present disclosure.

According to this method, operations of the primary device and secondary device are illustrated in FIGS. 8 and 9, respectively.

FIG. 8 is flowchart illustrating operations of the primary device that reproduces the same media as that of the secondary device according to an embodiment of the present disclosure.

Referring to FIG. 8, in operation 800, the primary device selects at least one medium from among multiple media, which is to be simultaneously reproduced in both of the primary and secondary devices. Selecting the at least one medium may be performed in response to a user input or under a separate control.

In operation 802, the primary device adds the simultaneous reproduction allowance information (plungeOt="sharable") that indicates simultaneous reproduction of the selected at least one medium, to the CI together with resource information of the selected at least one medium.

In operation 804, the primary device sends the resultant CI to the secondary device, and in operation 806, the primary device reproduces corresponding media based on the CI. The primary device may reproduce the same media as that of the secondary device.

FIG. 9 is flowchart illustrating operations of the secondary device that reproduces the same media as that of the primary device according to an embodiment of the present disclosure.

Referring to FIG. 9, in operation 900, the secondary device receives the CI from the primary device. In operation 902, the secondary device determines whether the CI contains the simultaneous reproduction allowance information.

If the CI contains the simultaneous reproduction allowance information, in operation 904, the secondary device detects at least one medium based on the simultaneous reproduction restriction information. In operation 906 the secondary device reproduces the at least one medium based on the resource information of the at least one medium contained in the CI.

If the CI does not contain the simultaneous reproduction allowance information, the secondary device ends the procedure.

(4) A Method for Transferring Medium to the Secondary Device for Reproduction

Figures 10A, 10B:
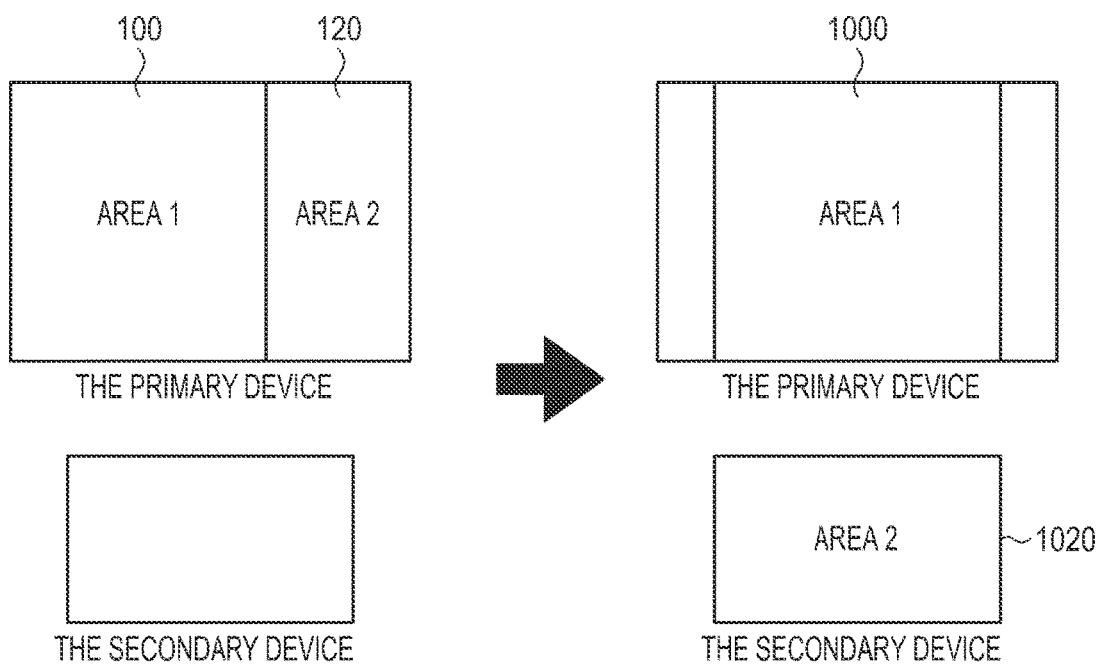
FIGS. 10A and 10B illustrate an embodiment of the present disclosure where media once reproduced at a primary device is transferred to a secondary device for reproduction according to an embodiment of the present disclosure.

FIGS. 10A and 10B illustrate an embodiment of the present disclosure where media once played at the primary device is transferred to the secondary device for reproduction according to an embodiment of the present disclosure.

Referring to FIG. 10A, the primary device may reproduce and display "video1" of Area1 100 and "video2" of Area2 120 on the screen, as shown in FIG. 1. If there is the secondary device, "video2" that has thus far been reproduced in the primary device at Area2 120 may be reproduced in the secondary device at Area2 1020. While "video2" is transferred and reproduced in the secondary device at Area2 1020, Area1 100 of the primary device may be rearranged to be Area1 1000 as shown in FIG. 10B based on new spatial information.

To assign the primary device the new spatial information for Area1 100, time information about when the media communication has performed between terminals. To provide such information through media communication between terminals, events about when to obtain and return media may be defined in CI, as represented in Table 6.

TABLE 6

```
<CI>
<head>
    <LoA>
        <AI id="Asset1" src="mmt://package1/asset1"
        mediatype="video"/>
        <AI id="Asset2" src="mmt://package1/asset2"
        mediatype="video"/>
```

TABLE 6-continued

```
        <AI id="Asset3" src="mmt://package1/asset3"
        mediatype="video"/>
    </LoA>
    <view id="View1" width="1920px" height="1080px">
        <divLocation id="divL1" width="70%" height="100%"
left="0%" top="0%" begin="0s AreaBack" end="divL2.AreaOut"
refDiv="Area1"/>
        <divLocation id="divL2" width="30%" height="100%"
left="70%" top="0%" refDiv="Area2" plungeOut="dynamic"/>
        <divLocation id="divL3" width="70%" height="100%"
left="15%" top="0%" begin="divL2.AreaOut" end="AreaBack"
refDiv="Area1"/>
    </view>
</head>
<body>
    <div id="Area1" width="1000px" height="1000px">
        <video id="video1" refAsset="Asset1" width="100%"
height="100%" left="0px" top="0px"/>
    </div>
    <div id="Area2" width="600px" height="1000px">
        <video id="video2" refAsset="Asset2" width="100%"
height="100%" left="0px" top="0px"/>
    </div>
    <div id="Area3" width="1024px" height="768px">
        <video id="video3" refAsset="Asset3" width="100%"
height="100%" left="0px" top="0px"/>
    </div>
</body>
</CI>
```

Referring to Table 6, information that is added to divLocation of "divL1", begin="0s AreaBack"end="divL2.AreaOut", indicates time to start reproduction and time to stop reproduction for Area1 100 as shown in FIG. 10A. Specifically, the information indicates that reproduction of "video1" in Area1 100 starts at 0 second and ends when "video2" is taken off Area2 120 of the primary device and transferred to Area2 1020 of the secondary device.

Information added to divLocation of "divL2", plungeOut="dynamic", indicates that an area for reproducing "video2" is dynamic, meaning that "video2" may be transferred to the secondary device for reproduction.

Furthermore, information added to divLocation of "divL3", begin="divL2.AreaOut"end="AreaBack", indicates when to start and stop reproduction in Area1 1000, as shown in FIG. 10B. Specifically, the information indicates that "video1" starts being reproduced when "video2" is taken off Area2 120 of the primary device to be reproduced in the secondary device and ends when "video 2" is reproduced back in Area2 120.

Figure 11:
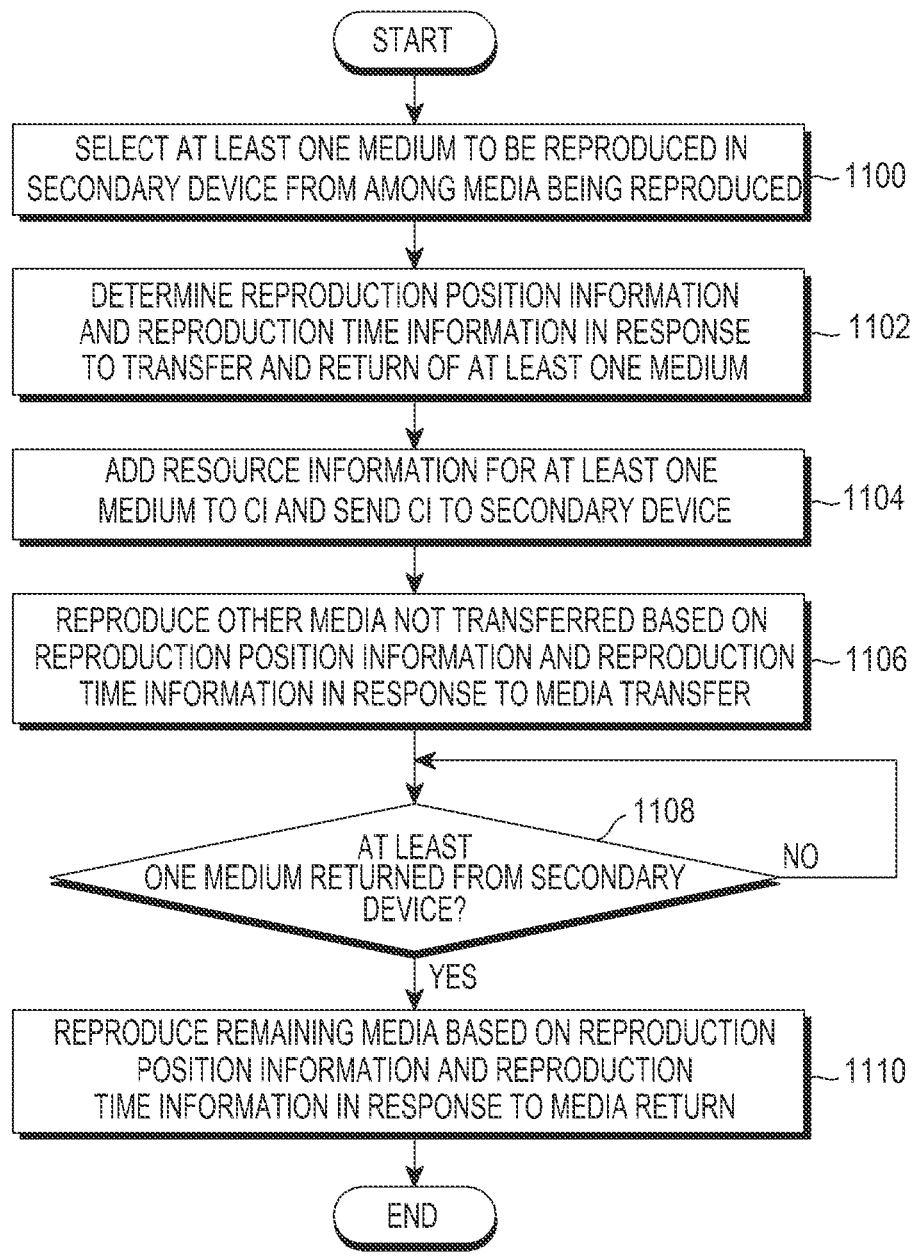
FIG. 11 is flowchart illustrating operations of a primary device that transfers media to a secondary device according to an embodiment of the present disclosure.
Figure 12:
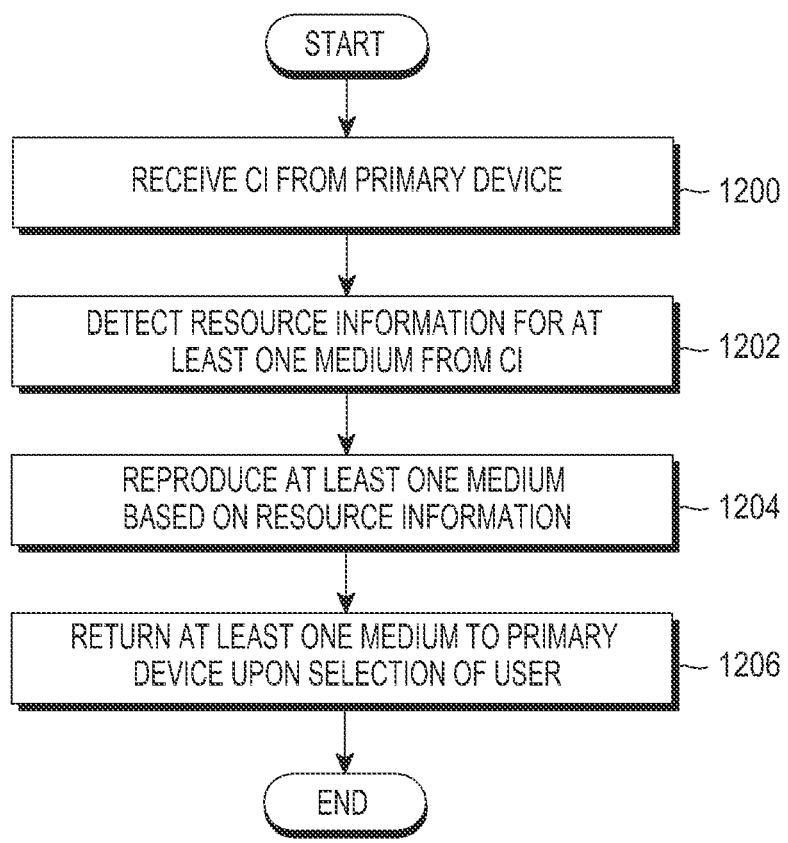
FIG. 12 is flowchart illustrating operations of a secondary device that reproduces media received from a primary device according to an embodiment of the present disclosure.

According to this method, operations of the primary device and secondary device are illustrated in FIGS. 11 and 12, respectively.

FIG. 11 is flowchart illustrating operations of the primary device that transfers media to the secondary device according to an embodiment of the present disclosure.

Referring to FIG. 11, in operation 1100, the primary device selects at least one medium from among multiple media being reproduced, which is to be reproduced in the secondary device. Selecting the at least one medium may be performed in response to a user input or under a separate control.

In operation 1102, the primary device determines where and when to reproduce media in response to transfer and return of the at least one medium. Specifically, information about where to reproduce media may contain information regarding positions of other media being reproduced than the at least one medium on the screen of the primary device in a case the at least one medium is to be reproduced in the primary device, and information regarding positions of other media than the at least one medium on the screen of the screen of the secondary device in a case the at least one medium is to be reproduced in the secondary device.

Information about when to reproduce media may contain information regarding time to start and stop reproducing other media than the at least one medium in the case the at least one medium is to be reproduced in the primary device, and information regarding time to start and stop reproducing other media than the at least one medium in the case the at least one medium is to be reproduced in the secondary device.

In operation 1104, the primary device adds resource information for the selected at least one medium to CI and sends the CI to the secondary device. The information about when and where to reproduce media may be added to the CI, but may be left out of the CI that is sent to the secondary device.

In operation 1106, the primary device reproduces other media than the at least one medium based on the information about when and where to reproduce media.

In operation 1108, the primary device determines whether the at least one medium is to be returned from the secondary device, i.e., whether the at least one medium is indicated to be reproduced back in the primary device, according to the user selection.

In operation 1110, in the case the at least one medium is returned, the primary device reproduces other media than the at least one medium based on the information about when and where to reproduce media in response to the media return.

FIG. 12 is flowchart illustrating operations of the secondary device that reproduces media received from the primary device according to an embodiment of the present disclosure.

Referring to FIG. 12, in operation 1200, the secondary device receives the CI from the primary device. In operation 1202, the secondary device detects from the CI resource information for the at least one medium, and in operation 1204, the secondary device reproduces the at least one medium based on the resource information.

In operation 1206, the secondary device returns the at least one medium to the primary device upon selection of the user. Specifically, the secondary device may return the at least one medium to the primary device by sending a request in a particular message to the primary device to reproduce the at least one medium or sending the primary device the resource information for the at least one medium.

(5) Method for Reconfiguring a Screen in Response to Media Communication

The primary device may receive from the secondary device at least one Area that contains media while displaying a particular Area based on CI. In this case, the primary device may rearrange the screen to display the received at least one Area together with the particular Area. Related explanation will be described in connection with FIGS. 13A and 13B.

Figures 13A, 13B:
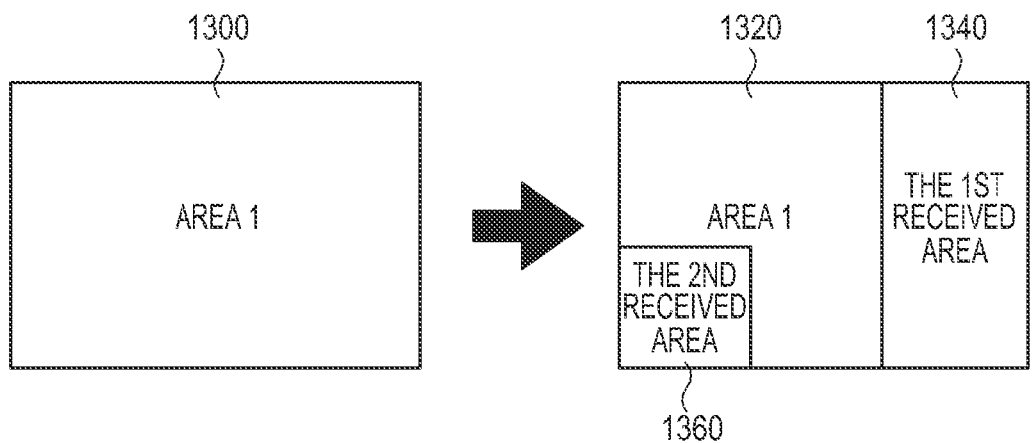
FIGS. 13A and 13B illustrate screen reconfiguration at a secondary device in response to additional media transfer according to an embodiment of the present disclosure.

FIGS. 13A and 13B illustrate screen reconfiguration at the secondary device in response to additional media transfer according to an embodiment of the present disclosure.

As shown in FIG. 13A, where the primary device displays Area1 1300 based on CI, if two Areas each containing a medium are transferred to the primary device, the primary device may rearrange the screen, as shown in FIG. 13B. The two Areas are displayed on particular positions of the screen of the primary device (e.g., in the first received area 1340 and the second received area 1360 in the receiving order), and pre-existing Area1 1300 may be rearranged on a new position 1320 based on new spatial information.

For this, the primary device may use CI as represented in Table 7 as an example.

TABLE 7

```
<CI>
<head>
    <LoA>
      <AI id="Asset1" src="mmt://package1/asset1"
      mediatype="video"/>
    </LoA>
      <view   id="View1"   width="1920px"  height="1080px"
begin="0s divL3.AreaOut AreasOut" end="AreaIn(1)" >
        <divLocation   id="divL1"   width="100%"  height="100%"
left="0%" top="0%" refDiv="Area1" />
      </view>
      <view id="View2" width="1920px" height="1080px"
begin="AreaIn(1)" end="divL3.AreaOut AreasOut ">
        <divLocation   id="divL2"   width="70%"  height="100%"
left="0%" top="0%" refDiv="Area1" />
        <divLocation   id="divL3"   width="30%"  height="100%"
left="70%" top="0%" plungeIn="1"/>
        <divLocation   id="divL4"   width="30%"  height="30%"
left="0%" top="70%" begin="AreaIn(2)" plungeIn="2" />
      </view>
</head>
<body>
    <div id="Area1" width="1000px" height="1000px">
      <video id="video1" refAsset="Asset1" width="100%"
height="100%" left="0px" top="0px"/>
    </div>
</body>
</CI>
```

Referring to Table 7, information added to View1, begin="0s divL3.AreaOut AreasOut"end="AreaIn(1)", indicates that display of Area1 1300 starts from 0 second, or starts when there is no other Area to be displayed in a position where the Area1 is to be displayed and ends if there is any other Area to be displayed in the position. That is, View1 is displayed if only Area1 1300 exists.

Information added to View2, begin="AreaIn(1)" end=divL3.AreaOut AreasOut", indicates that display of Area1 1300 starts when there is another additional Area to be displayed in a position where the Area1 is to be displayed and ends if there is no other Area to be displayed in the position. That is, View2 is displayed if there is an additional Area in addition to Area1 1300.

Another information added to View2, plungeIn="1" and plungeIn="2", indicates where to arrange the received Areas on the screen, e.g., where to arrange the first received Area 1340 and where to arrange the second received Area 1360.

According to the CI of Table 7, as shown in FIG. 13A, Area1 1300 starts to be reproduced from 0 second based on divLocation of View1. If information regarding the Area is received through media communication, displaying View1 ends and View2 is displayed as shown in FIG. 13B. According to divLocation of "divL2", Area1 resumes being reproduced at a new position 1320.

DivLocation of "divL3" of View2 is determined to be an empty area according to an attribute added thereto through media communication, which becomes first received area 1340 according to a value of the attribute, plungeIn="1". DivLocation of "divL4" of View2 is also determined to be empty area 1360 according to a value of the attribute, plungeIn="2".

Reproduction of View2 stops when an Area of "divL3" is returned or when a stop event occurs when all Areas once transferred are returned, and View1 resumes being reproduced according to a start event.

Operations of the primary device according this method will be described in connection with FIG. 14.

Figure 14:
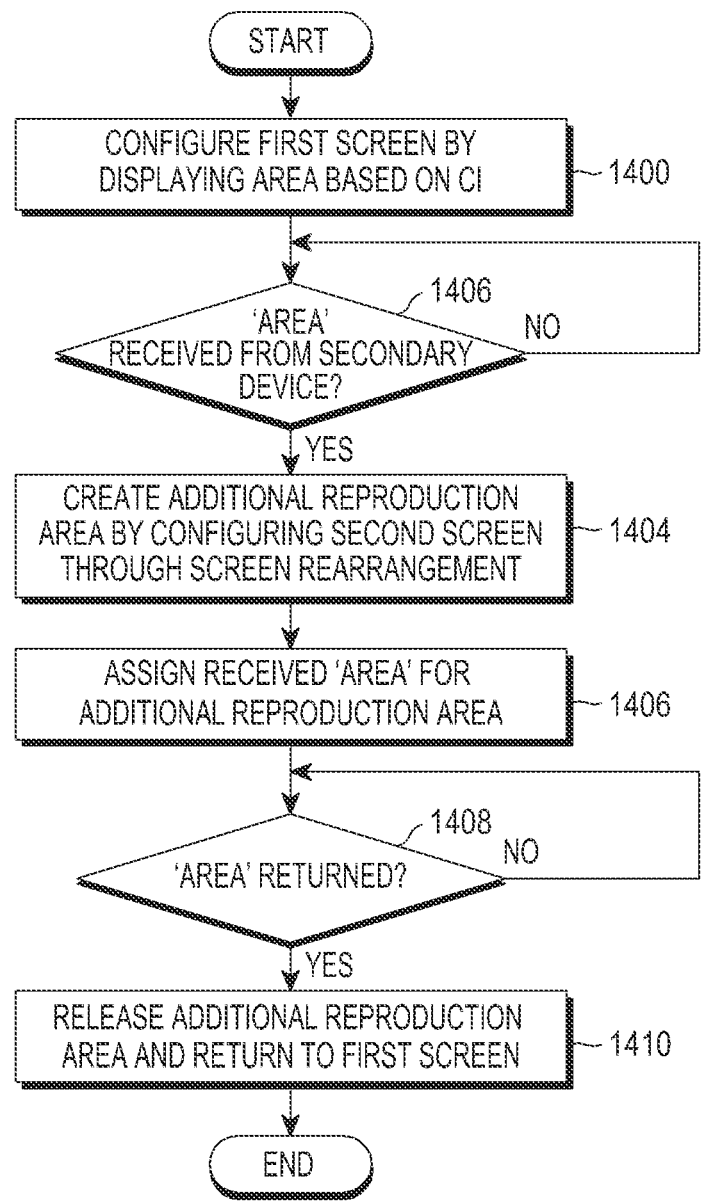
FIG. 14 is flowchart illustrating operations of a secondary device that changes screen configuration based on media communication according to an embodiment of the present disclosure.

FIG. 14 is flowchart illustrating operations of the secondary device that changes screen configuration in response to media communication according to an embodiment of the present disclosure.

Referring to FIG. 14, in operation 1400, the primary device configures a first screen by displaying a corresponding Area based on CI. In operation 1402, the primary device determines whether an Area containing media has been received from the secondary device.

Upon reception of the Area, in operation 1404, the primary device configures a second screen through screen rearrangement such that an additional reproduction area (empty area) for the received Area may be created. In operation 1406, the primary device assigns the received Area for the additional reproduction area.

In this regard, the primary device may receive multiple Areas from the secondary device, and may create multiple additional reproduction areas. The primary device may assign multiple Areas for multiple additional reproduction areas on a predetermined basis. For example, the primary device may assign Areas for areas determined in the receiving order.

In operation 1408, if the primary device determines that the received Area has been returned, in operation 1410, the primary device releases the additional reproduction area(s) and returns to the first screen.

Although FIG. 14 illustrates operations of the primary device, the operations may be performed by the secondary device.

Table 8 represents an example of information regarding an Area to be sent from the primary device to the secondary device through media communication.

TABLE 8

| Syntax | No. of bits | Mnemonic |
|---|---|---|
| Multi-device_Presentation_Command( ){ | | |
|   initialization_flag | 1 | bslbf |
|   reserved | 7 | bslbf |
|   if(initialization_flag=='1'){ | | |
|     area_width | 16 | uimsbf |
|     area_height | 16 | |
|   } | | |
|   no_of_asset | 8 | uimsbf |
|   for(i=0;i<no_of_asset;i++){ | | |
|     asset_id_length | 8 | uimsbf |
|     asset_id | 8 × N | bslbf |
|     mediatype | 8 | uimsbf |
|     if(initialization_flag=='1'){ | | |
|       no_of_source | 8 | uimsbf |
|       for(j=0;j<no_of_source;j++){ | | |
|         src_length | 8 | uimsbf |
|         src | 8 × N | bslbf |
|       } | | |
|       asset_top | 16 | uimsbf |
|       asset_left | 16 | uimsbf |
|       asset_width | 16 | uimsbf |
|       asset_height | 16 | uimsbf |
|       asset_z-index | 8 | tcimsbf |
|     } | | |
|     if(mediatype=='0x00'){ | | |
|       view_id_length | 8 | uimsbf |
|       view_id | 8 × N | bslbf |
|     } | | |
|     current_time | 32 | uimsbf |
|   } | | |
| } | | |

Referring to Table 8, it can be seen that information that has to be provided first includes spatial information of the Area, src information of assets within the Area, and information regarding assets' reproduction times thus far, and that subsequent information includes information regarding each asset's reproduction time to provide synchronization among assets.

Figure 15A:
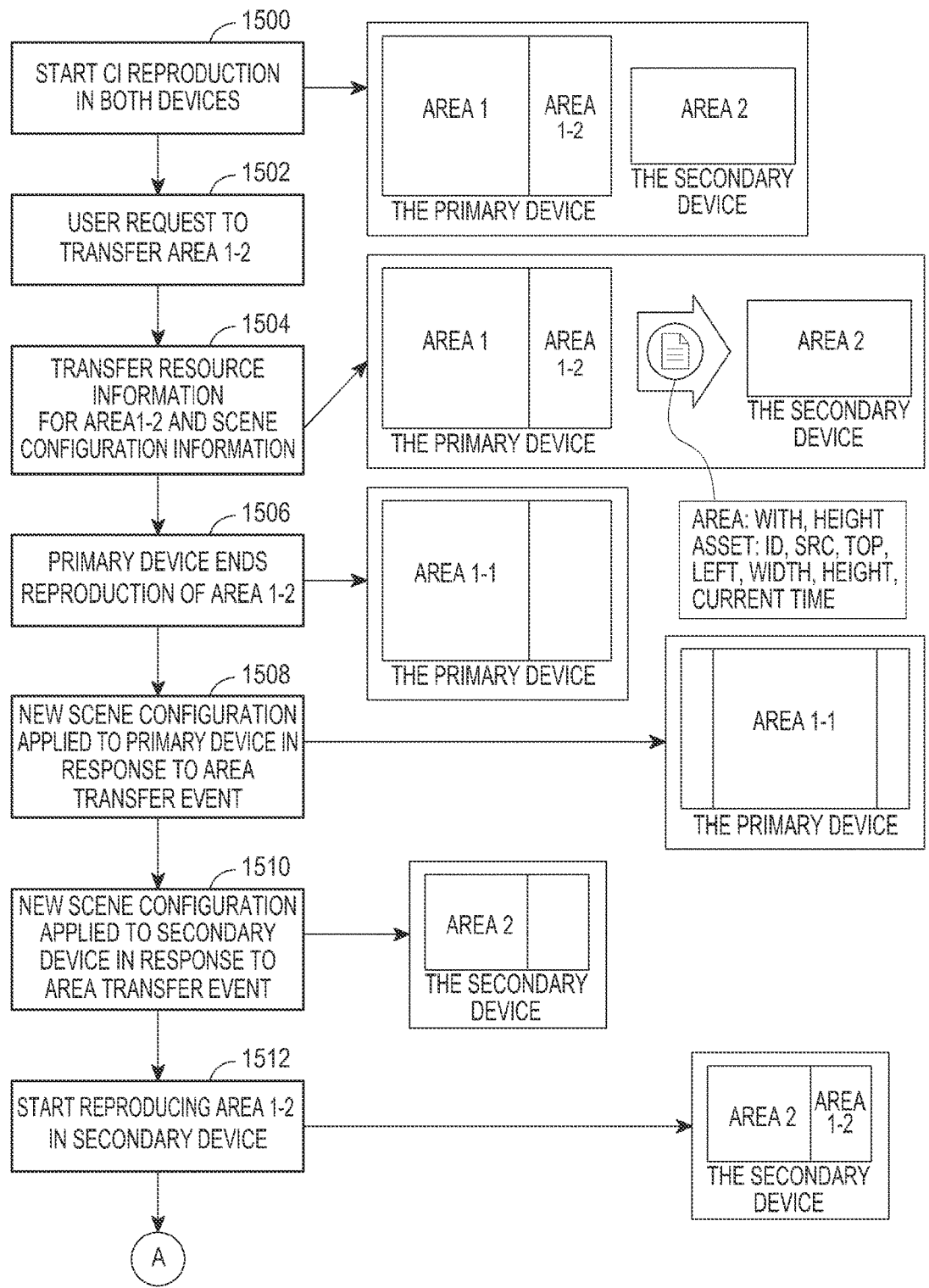
FIGS. 15A and 15B illustrate a procedure of performing a service based on media communication between terminals by using CI according to an embodiment of the present disclosure.
Figure 15B:
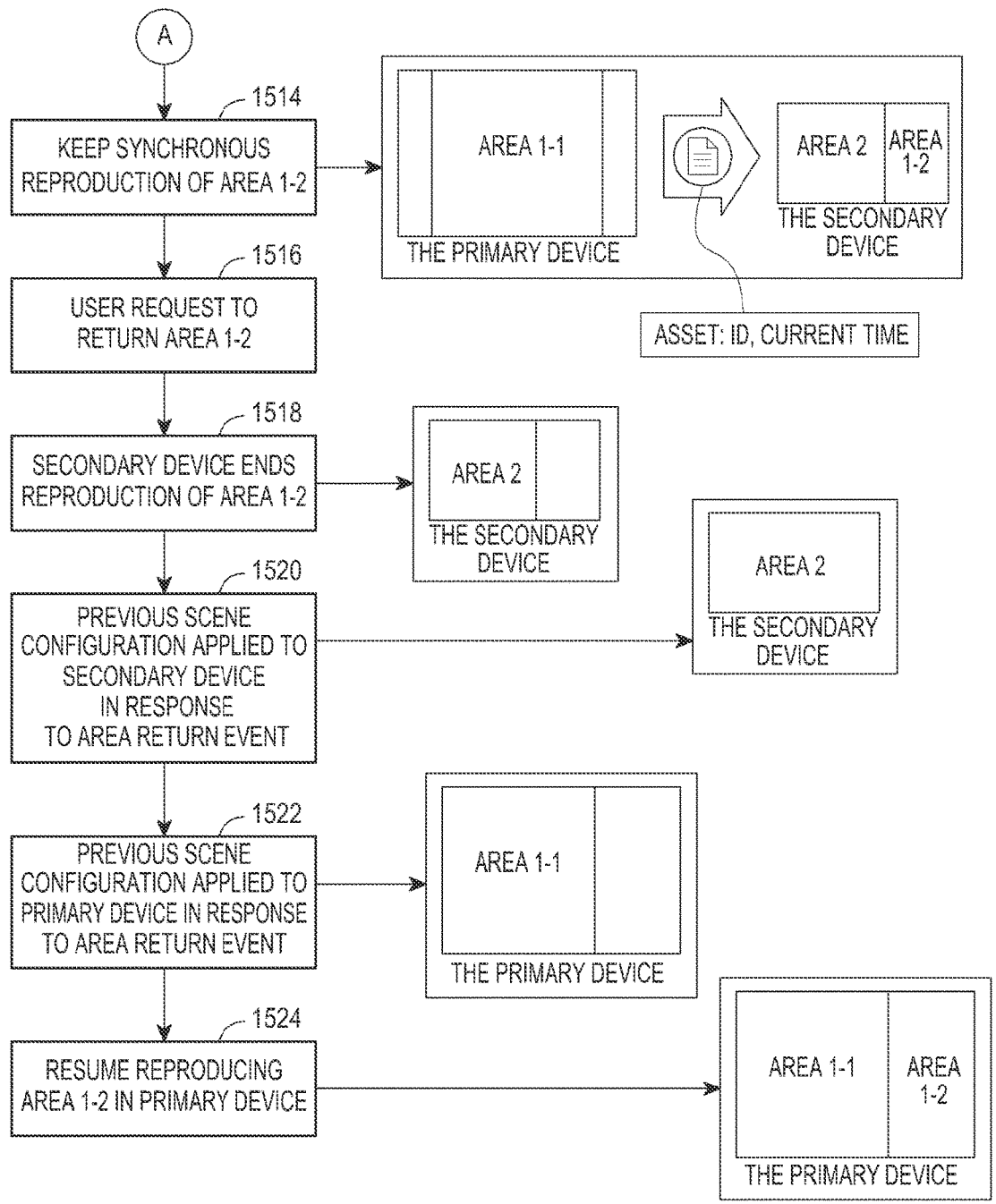

FIGS. 15A and 15B illustrate a procedure of performing a service based on media communication using CI according to an embodiment of the present disclosure.

Referring to FIG. 15A, in operation 1500, the primary device and the secondary device each start reproducing media based on CI. For example, the primary device starts reproducing Area1 and Area1-2 while the secondary device starts reproducing Area2.

In operation 1502, the user may request the primary device to perform media communication of Area1-2, i.e., to transfer Area1-2 to the secondary device for reproduction. Then, in operation 1504, the primary device may send resource information for Area1-2 and scene configuration information, i.e., CI to the secondary device. In operation 1506, the primary device ends reproduction of the Area1-2.

In operation 1508, an event that occurs from the Area transfer causes new scene configuration information to be applied in the primary device. In operation 1510, the event causes new scene configuration information to be applied in the secondary device. For example, Area1-1 being reproduced in the primary device and Area2 being reproduced in the secondary device may be rearranged at new positions.

In operation 1512, the secondary device starts reproducing Area1-2. The secondary device reproduces the Area1-2 at a position determined from the information regarding Area and information regarding empty area in the CI received from the primary device. In the embodiment of FIG. 15A, Area1-2 is reproduced at a position on the right of Area2.

Symbol 'A' indicates operation 1512 of FIG. 15A is followed by operation 1514 of FIG. 15B, and subsequent operations of operation 1512 will be described with reference to FIG. 15B.

Referring to FIG. 15B, in operation 1514, to maintain synchronous reproduction of Area1-2, the primary device sends time information of each asset to the secondary device, periodically. In operation 1516, the user may request the secondary device to return Area1-2, i.e., to send Area1-2 back to the primary device, and in operation 1518, the secondary device ends reproduction of Area1-2.

Subsequently, in operation 1520, the secondary device returns to its previous scene configuration in response to an event that occurs from the media return. In operation 1522, the primary device returns to its previous scene configuration in response to an event that occurs from the media return. In operation 1524, the primary device resumes reproducing Area1-2.

Figure 16:
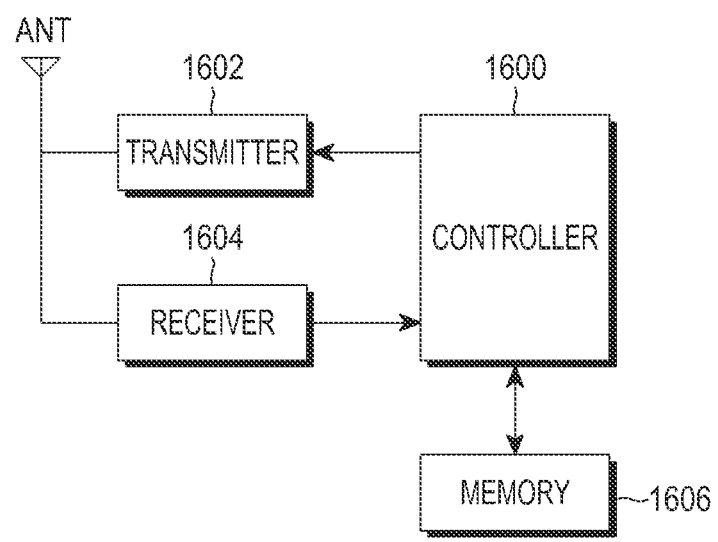
FIG. 16 is a block diagram of a terminal according to an embodiment of the present disclosure.

FIG. 16 is a block diagram of a terminal according to an embodiment of the present disclosure.

The terminal may correspond to the primary device or the secondary device.

Referring to FIG. 16, the terminal includes a controller 1600, a transmitter 1602, a receiver 1604, and a memory 1606.

The controller 1600 controls general operation of the terminal, including operations of the transmitter 1602, receiver 1604, and memory 1606.

Especially, the controller 1600 performs operations of the primary device or the secondary device in terms of various embodiments of the aforementioned methods.

The transmitter 1602 and the receiver 1604 perform wireless communication of the terminal, and may further include separate components.

The memory 1606 stores data and information generated from operations of the terminal, media, etc.

According to embodiments of the present disclosure, a technology to provide information used for media communication between terminals by using scene configuration information may become a base for providing scene configuration and multi-screen services in a single application, and may be efficiently used to reduce duplicate usages of overlapping functionalities between the two services.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing a multi-screen presentation by a primary device in a multimedia communication system, the method comprising:

obtaining composition information (CI) including a view element; and presenting a view including one or more areas on a primary screen of the primary device based on spatial and temporal information provided by information for each of the one or more areas in the view element, each of the one or more areas representing a spatial region related to one or more media elements, wherein a first area of the one or more areas is shown at both the primary screen and a secondary screen of a secondary device, if a first attribute included in information for the first area in the view element includes a first value indicating that the first area is allowed to be used for the multi-screen presentation and to be shown at both the primary screen and the secondary screen, and wherein the first area is shown at the primary screen, if the first attribute includes a second value indicating that the first area is not allowed to be used for the multi-screen presentation.

2. The method of claim 1, wherein the CI includes list information including a list of media elements.

3. The method of claim 2, wherein the list information includes an attribute indicating an address related to each of the media elements.

4. The method of claim 1, wherein a second area different from the one or more areas is shown at the secondary screen, if a second attribute included in information for the second area in the view element includes a third value indicating that the second area is allowed to be used for the multi-screen presentation and to be shown at the secondary screen.

5. The method of claim 1, wherein a second area different from the one or more areas is shown at the secondary screen, if a third attribute included in information for the second area in the view element includes a fourth value indicating that the second area is allowed to be used for the multi-screen presentation and to be shown at the secondary screen, and wherein the second area is not shown at the primary screen before the beginning of the multi-screen presentation based on the fourth value.

* * * * *